United States Patent
Cronie

(10) Patent No.: US 9,889,564 B2
(45) Date of Patent: Feb. 13, 2018

(54) STABLE GRASP POINT SELECTION FOR ROBOTIC GRIPPERS WITH MACHINE VISION AND ULTRASOUND BEAM FORMING

(71) Applicant: Empire Technology Development LLC, Wilmington, DE (US)

(72) Inventor: Harm Stefan Cronie, Poliez-le-Grand (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/794,648

(22) Filed: Jul. 8, 2015

(65) Prior Publication Data
US 2017/0008172 A1    Jan. 12, 2017

(51) Int. Cl.
B25J 9/16    (2006.01)

(52) U.S. Cl.
CPC .......... B25J 9/1669 (2013.01); B25J 9/1612 (2013.01); B25J 9/1697 (2013.01);
(Continued)

(58) Field of Classification Search
CPC ...... B35J 9/1669; B35J 9/1697; B35J 9/1612; B35J 9/1633; B35J 9/1653;
(Continued)

(56) References Cited

U.S. PATENT DOCUMENTS

| 4,046,477 A | 9/1977 | Kaule |
|---|---|---|
| 4,284,403 A | 8/1981 | Rey |
| (Continued) | | |

FOREIGN PATENT DOCUMENTS

| EP | 2096628 A1 | 9/2009 |
|---|---|---|
| WO | 2005123513 A1 | 12/2005 |
| WO | 2016096810 A1 | 6/2016 |

OTHER PUBLICATIONS

"Acoustic Levitation," accessed at http://web.archive.org/web/20150404202537/http://en.wikipedia.org/wiki/Acoustic_levitation, accessed on Apr. 24, 2015, pp. 1-3.
(Continued)

*Primary Examiner* — Bao Long T Nguyen
(74) *Attorney, Agent, or Firm* — Turk IP Law, LLC

(57) ABSTRACT

Technologies are generally described for grasp point selection for robotic grippers through machine vision and ultrasound beam based deformation. The grasp point selection may aim to increase a probability that the grasp points on an object behave in a substantially similar way when a robotic gripper executes a corresponding grasp on the object. According to some examples, an outline of an object may be extracted from a three-dimensional (3D) image of the object and a set of points may be selected as candidate grasp points from the outline based on the candidate grasp points' potential to achieve force closure. One or more ultrasound transducers may be used to exert a local force on the candidate grasp points through an ultrasound beam and resulting local deformations may be recorded. Final grasp points may be selected based on having similar response to the force applied by the ultrasound transducers.

22 Claims, 11 Drawing Sheets

(52) U.S. Cl.
CPC .............. *G05B 2219/39505* (2013.01); *G05B 2219/39509* (2013.01); *G05B 2219/39536* (2013.01); *G05B 2219/40053* (2013.01)

(58) Field of Classification Search
CPC ....... B35J 9/1664–9/1666; B35J 9/1674; B35J 13/08; B35J 13/087; B35J 19/02–19/021; B35J 19/023; B35J 19/04; G05B 2219/39536; G05B 2219/39509; G05B 2219/40053; G05B 2219/39505; G05B 19/401; G05B 19/402; G05B 19/406; G05B 2219/39469; G05B 2219/39473; G05B 2219/39484; G05B 2219/39515; G05B 2219/39542; G05B 2219/40564; Y10S 901/46–901/47
USPC ...................... 700/259, 250, 253; 901/46–47
See application file for complete search history.

(56) References Cited

U.S. PATENT DOCUMENTS

| | | | |
|---|---|---|---|
| 4,870,623 A | 9/1989 | Buckley et al. | |
| 5,165,218 A | 11/1992 | Callahan, Jr. | |
| 5,500,493 A | 3/1996 | Guigné et al. | |
| 5,844,140 A | 12/1998 | Seale | |
| 6,244,644 B1* | 6/2001 | Lovchik | B25J 9/104 294/111 |
| 7,707,001 B2 | 4/2010 | Obinata et al. | |
| 7,870,946 B2 | 1/2011 | Zimmermann et al. | |
| 7,952,583 B2 | 5/2011 | Waechter et al. | |
| 8,118,156 B2 | 2/2012 | Kondoh | |
| 8,259,298 B2 | 9/2012 | Berghmans | |
| 8,930,015 B2 | 1/2015 | Johnston et al. | |
| 9,317,652 B1 | 4/2016 | Jacobs | |
| 9,321,176 B1* | 4/2016 | Sun | B25J 9/1612 |
| 2006/0012198 A1* | 1/2006 | Hager | B25J 15/0009 294/106 |
| 2009/0048516 A1 | 2/2009 | Yoshikawa et al. | |
| 2010/0169815 A1* | 7/2010 | Zhao | B25J 9/1633 715/771 |
| 2011/0270443 A1* | 11/2011 | Kamiya | G05B 19/401 700/245 |
| 2013/0147944 A1 | 6/2013 | Zhang et al. | |
| 2013/0211593 A1 | 8/2013 | Domae et al. | |
| 2013/0343640 A1 | 12/2013 | Buehler et al. | |
| 2014/0156066 A1* | 6/2014 | Sakano | B25J 13/082 700/245 |

OTHER PUBLICATIONS

"Three-Dimensional Mid-Air Acoustic Manipulation," accessed at https://www.youtube.com/watch?v=odJxJRAxdFU accessed on Apr. 24, 2015, pp. 1-2.
Choi, C. Q., "A Tractor Beam Made of Sound," Popular Mechanics, accessed at http://web.archive.org/web/20140819112744/http://www.popularmechanics.com/technology/engineering/extreme-machines/a-tractor-beam-made-of-sound-16754329 accessed on Apr. 24, 2015, pp. 1-4.
Leon, B. et al. "Robot Grasping Foundations," Cognitive Systems Monographs, vol. 19, pp. 15-31 (2014).
Sanz, P. J. "Grasping the Not-so-obvious," Vision-Based Object Handling for Industrial Applications, IEEE Robotics and Automation Magazine, pp. 44-52 (Sep. 2005).
Saxena, A. "Robotic Grasping of Novel Objects using Vision," Computer Science Department, pp. 1-15.
Brokowski, M.E., and Peshkin, M., "Impedance Restrictions on Independent Finger Grippers," IEEE Transactions on Robotics and Automation, vol. 13, Issue 4, pp. 617-622 (Aug. 1997).

International Search Report and Written Opinion for International Application No. PCT/US2016/034518 dated Aug. 30, 2016, pp. 8.
"3D Acoustic Levitation Printing," MattBdreaming, accessed at https://mattbdreaming.wordpress.com/3d-acoustic-levitation-printing/, accessed on Jul. 13, 2017, pp. 4.
"Advanced Composites," Innegra Technologies, accessed at https://web.archive.org/web/20150504194502/http://www.innegratech.com/, archived on May 4, 2015, accessed on Jul. 28, 2017, pp. 2.
"Food Volume To Weight conversions: 4153 foods calories and nutrients calculator," USDA National Nutrient Database for Standard Reference, accessed at http://www.aqua-calc.com/calculate/food-volume-to-weight/substance/snacks-aorna-and-blank-potato-blank-chips-coma-and-blank-white-coma-and-blank-restructured-coma-and-blank-baked, accessed on Jul. 28, 2017, pp. 2.
"Seismic Isolator for Buildings," Bridgestone Corporation, accessed at http://www.bridgestone.com/products/diversified/antiseismic_rubber/product.html, accessed on Jul. 28, 2017, pp. 3.
"Sonic Levitation," accessed at https://web.archive.org/web/20141013125211/http://www.soniclevitation.com:80/ sonic-levitation/, archived on Oct. 13, 2014, accessed on Jul. 26, 2017, pp. 5.
Benmore, C.J., and Weber, J.K.R., "Amorphization of Molecular Liquids of Pharmaceutical Drugs by Acoustic Levitation," Physical Review X, vol. 1, Issue 1, pp. 011004-1—011004-7, American Physical Society (Aug. 8, 2011).
Browne, C.B., et al., "A Survey of Monte Carlo Tree Search Methods," IEEE Transactions on Computational Intelligence and AI in Games, vol. 4, Issue 1, pp. 1-43 (Mar. 2012).
Byford, S., "Google's AlphaGo AI beats Lee Se-dol again to win Go series 4-1," @345triangle, accessed at https:// Nww.theverge.com/2016/3/15/11213518/alphago-deepmind-go-match-5-result, Mar. 15, 2016, pp. 4.
Delettre, A., et al., "2-Dof contactless distributed manipulation using superposition of induced air flows", IEEE/RSJ International Conference on Intelligent Robots and Systems (IROS), Version 1, pp. 5121-5126 (Sep. 25-30, 2011).
Iwaki, S., et al., "Contactless Manipulation of an Object on a Plane Surface using Multiple Air Jets," IEEE International conference on Robotics and Automation, pp. 3257-3262 (May 9-13, 2011).
Junior, B.A., et al., "Dealing with Nonregular Shapes Packing," Mathematical Problems in Engineering, vol. 2014, Article ID 548957, pp. 1-10 (Jul. 8, 2014).
Liberatore, S., "Use the force! Watch researchers test a 'Jedi glove' that can levitate objects in mid-air using sound (and they've also made a working Dr Who sonic screwdriver)," Dailymail, accessed at http://www.dailymail.co.uk/ sciencetech/article-3599653/Use-force-Watch-researchers-test-Jedi-glove-levitate-objects-mid-air-using-sound-ve-working-Dr-sonic-screwdriver.html, May 19, 2016, pp. 26.
Ochiai, Y., "Pixie Dust: Graphical Levitation System," accessed at https://www.youtube.com/watch?v=NLgD3EtxwdY, May 26, 2014, pp. 3.
Ochiai, Y., et al., "Pixie Dust: Graphics Generated by Levitated and Animated Objects in Computational Acoustic-Potential Field", ACM Transactions on Graphics, vol. 33, No. 4, Article 85, pp. 1-13 (Jul. 2014).
Ochiai, Y., et al., "Three-Dimensional Mid-Air Acoustic Manipulation by Ultrasonic Phased Arrays," Plos one, vol. 9, No. 5, pp. 1-5 (May 21, 2014).
Silver, D., et al., "Mastering the Game of Go with Deep Neural Networks and Tree Search," Nature, vol. 529, pp. 184-489, Macmillan Publishers Limited (Jan. 28, 2016).
Zhao, S., and Wallaschek, J., "A standing wave acoustic levitation system for large planar objects," Archive of Applied Mechanics, vol. 81, Issue 2, pp. 123-139 (Feb. 2011).
Zyga, L., "Researchers demonstrate acoustic levitation of a large sphere," accessed at https://phys.org/news/2016-08-acoustic-levitation-large-sphere.html, Aug. 12, 2016, pp. 5.

* cited by examiner

COMPUTER PROGRAM PRODUCT 1000

SIGNAL-BEARING MEDIUM 1002

1004 ONE OR MORE INSTRUCTIONS TO

OBTAIN 3D IMAGE OF AN OBJECT;
DETERMINE SETS OF CANDIDATE GRASP POINTS BASED ON THE 3D IMAGE OF THE OBJECT;
EXERT FORCE AROUND CANDIDATE GRASP POINTS THROUGH ULTRASOUND BEAM TO CAUSE LOCAL DEFORMATIONS;
DETERMINE CANDIDATE GRASP POINTS WITH SIMILAR LOCAL DEFORMATIONS THROUGH 3D IMAGING; AND
DETERMINE THE PARTICULAR DISTANCE BETWEEN THE SELECT GRASP POINTS AMONG CANDIDATE GRASP POINTS WITH SIMILAR LOCAL DEFORMATIONS.

| COMPUTER-READABLE MEDIUM 1006 | RECORDABLE MEDIUM 1008 | COMMUNICATIONS MEDIUM 1010 |

FIG. 10

STABLE GRASP POINT SELECTION FOR ROBOTIC GRIPPERS WITH MACHINE VISION AND ULTRASOUND BEAM FORMING

BACKGROUND

Unless otherwise indicated herein, the materials described in this section are not prior art to the claims in this application and are not admitted to be prior art by inclusion in this section.

The use of advanced robot manipulators in manufacturing is increasing. Robot manipulators may not only be used in the assembly of products, such as electronic devices and cars, but may also be used to perform processing steps such as welding and painting. For the latter application, general-purpose robot manipulators may handle custom tools designed for these processing steps.

A key skill of a robot manipulator is its ability to handle objects by means of a robot hand or robotic gripper. Robotic grippers exist in many configurations and their main goal is to be able to hold an object in a stable grasp even under disturbing forces acting on the object. Robot grasps can be analyzed and one of the physical constraints that defines a stable grasp is force closure. Force closure occurs when the forces exerted on an object by the fingers of a robotic gripper sum to zero. To achieve force closure the direction and magnitude of the forces exerted by the individual fingers on the grasp points of the object need to have a specific direction and magnitude, respectively, which is a challenging process for a robot manipulator.

SUMMARY

The present disclosure generally describes techniques for grasp point selection for robotic grippers through machine vision and ultrasound beam based deformation.

According to some examples, methods to provide grasp point selection for robotic grippers are described. An example the method may include obtaining a three-dimensional image of an object to be grasped by a robotic gripper, determining two or more sets of candidate grasp points on two or more surfaces of the object based on the three-dimensional image, and exerting a local force on each of the candidate grasp points in the two or more sets of candidate grasp points such that a local deformation is caused at or near each candidate grasp point. The method may also include selecting a set of grasp points from the two or more sets of candidate grasp points based on a response of a surface area at or near each candidate grasp point to the exerted force.

According to other examples, systems to provide grasp point selection for robotic grippers are described. An example the system may include a three-dimensional imaging module configured to obtain a three-dimensional image of an object to be grasped by a robotic gripper; an ultrasound signal source configured to exert a local force on each candidate grasp point in two or more sets of candidate grasp points such that a local deformation is caused at or near each candidate grasp point; and a controller coupled to the three-dimensional imaging module and the ultrasound signal source. The controller may be configured to determine the two or more sets of candidate grasp points on two or more surfaces of the object based on the three-dimensional image; select a set of grasp points from the two or more sets of candidate grasp points based on a response of a surface area at or near each candidate grasp point to the exerted force; and provide information associated with the selected set of grasp points to the robotic gripper.

According to further examples, a controller to provide grasp point selection for robotic grippers is described. The controller may include a memory configured to store instructions; a communication module configured to communicate with an ultrasound signal source, a three-dimensional imaging module, and a robotic gripper; and a processor communicatively coupled to the memory and the communication module. The processor may be configured to control the three-dimensional imaging module to obtain a three-dimensional image of an object to be grasped by the robotic gripper; extract an outline of the object from the three-dimensional image; extract two or more sets of candidate grasp points on two or more surfaces of the object based on the outline; control the ultrasound signal source to exert a local force on each candidate grasp point in the two or more sets of candidate grasp points such that a local deformation is caused at or near each candidate grasp point; select a set of grasp points from the two or more sets of candidate grasp points based on a response of a surface area at or near each candidate grasp point to the exerted force; and provide information associated with the selected set of grasp points to the robotic gripper.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 10 illustrates a block diagram of an example computer program product, all arranged in accordance with at least some embodiments described herein.

DETAILED DESCRIPTION

Figure 1:
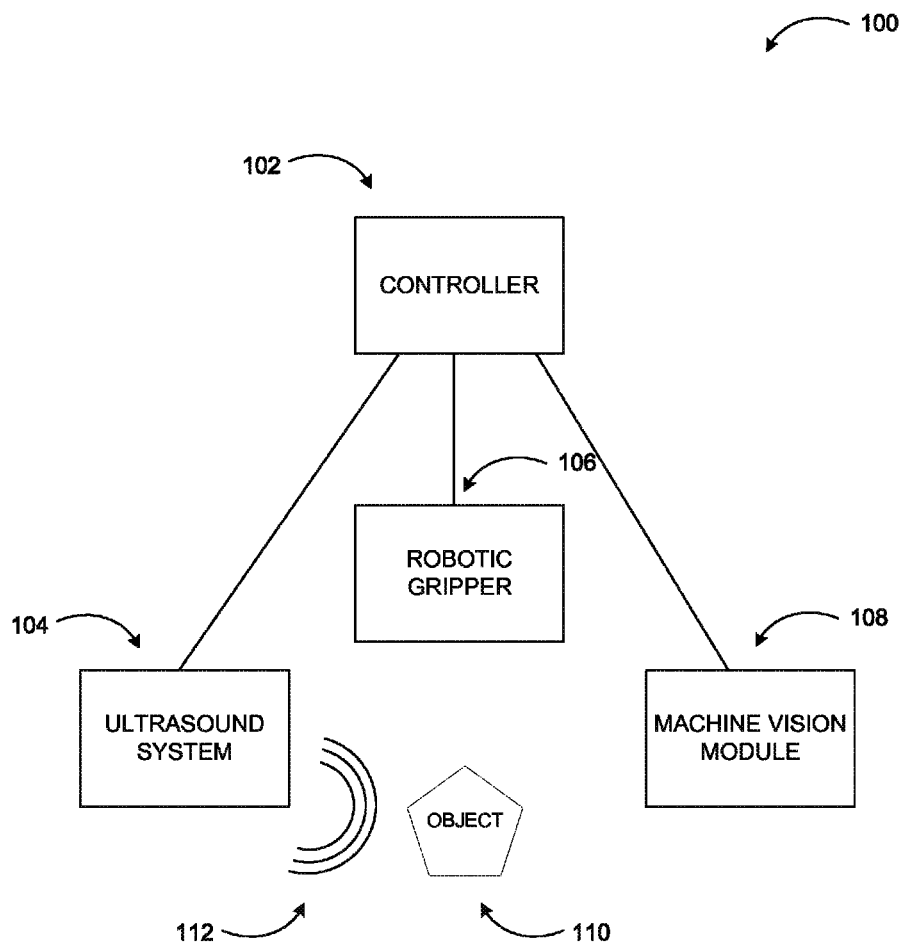
FIG. 1 is a block diagram illustrating various components of a robotic gripper control system that provides stable grasp point selection through machine vision and ultrasound based force exertion.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, among other things, to methods, apparatus, systems, devices, and/or computer program products related to grasp point selection for robotic grippers through machine vision and ultrasound beam based deformation.

Briefly stated, technologies are generally described for grasp point selection for robotic grippers through machine vision and ultrasound beam based deformation. The grasp point selection may aim to increase a probability that the grasp points on an object behave in a substantially similar way when a robotic gripper executes a corresponding grasp on the object. According to some examples, an outline of an object may be extracted from a three-dimensional (3D) image of the object and a set of points may be selected as candidate grasp points from the outline based on the candidate grasp points' potential to achieve force closure. One or more ultrasound transducers may be used to exert a local force on the candidate grasp points through an ultrasound beam and resulting local deformations may be recorded. Final grasp points may be selected based on having similar response to the force applied by the ultrasound transducers.

FIG. 1 is a block diagram illustrating various components of a robotic gripper control system that provides stable grasp point selection through machine vision and ultrasound based force exertion, arranged in accordance with at least some embodiments described herein.

As shown in a diagram 100, an example system for grasp point selection for robotic grippers through machine vision and ultrasound beam based deformation may include an ultrasound system 104 and a machine vision module 108, each communicatively coupled to a controller 102. The controller 102 may also be coupled to a robotic gripper 106, and control grasping operations performed by the robotic gripper 106 on an object 110. The machine vision module 108 may capture 3D images of the object 110 to determine an outline of the object, from which the controller 102 may determine sets of candidate grasp points. The controller 102 may affect the ultrasound system 104 to exert force on or in a vicinity of the candidate grasp points through an ultrasound beam 112 and local deformations at or near those candidate grasp points may be recorded through additional 3D images. The controller 102 may then select final grasp points for the robotic gripper 106 based on sets of candidate grasp points with similar local deformations as recorded in the additional 3D images.

For the determination of the candidate grasp points, force closure may be used as criterion. Force closure means that the forces exerted on the object 110 by fingers of the robotic gripper 106 sum to zero. To achieve force closure, a direction and a magnitude of the forces exerted by the individual fingers on the grasp points of the object 110 need to have a specific direction and magnitude, respectively. Practical objects have surfaces that have friction, which may relax the direction constraint on forces to be applied to an object with the aim of force closure. Furthermore, some objects may have a level of elasticity and deform under an applied force. When these factors are taken into account, the requirements for force closure may be relaxed and instead of a zero sum in one particular direction, a total force vector for each grasp point may just need to lie in a cone that is directed outwards from the surface of the object. The cone may depend on the properties of the material that make up the object and a shape of the object. Thus, candidate grasp points may be selected based on one or more of a shape of the object 110, an orientation of the object 110, and a type of the robotic gripper 106. The force closure for the selected final grasp points may result in a stable grasp once the robotic gripper 106 executes a synthesized grasp even if a shape and/or a composition of the object 110 is not known a priori or the object 110 is partially occluded.

Figure 2:
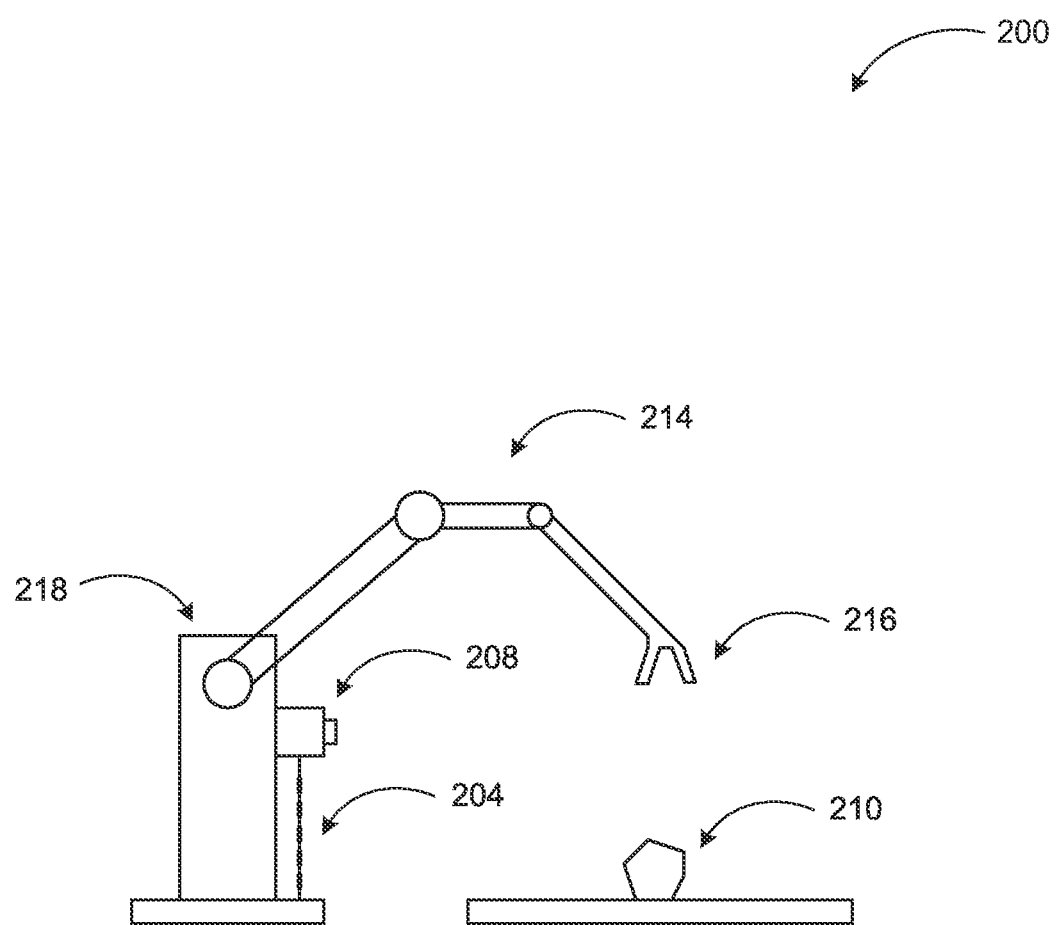
FIG. 2 is a conceptual diagram illustrating various components of a robotic gripper control system that provides stable grasp point selection through machine vision and ultrasound based force exertion.

FIG. 2 is a conceptual diagram illustrating various components of a robotic gripper control system that provides stable grasp point selection through machine vision and ultrasound based force exertion, arranged in accordance with at least some embodiments described herein.

As shown in a diagram 200, a robot manipulator 218 may operate in a factory to construct products, for example. The robot manipulator 218 may be equipped with a robotic arm 214 and a robotic gripper 216 to handle objects such as an object 210. Objects may be picked up from a storage bin and moved to a working area for the assembly of a product, for example. In some cases, shapes and compositions of the objects may not necessarily be known in advance. In such case, it may not be clear as to how to grab a particular object and which grasp points to choose for the fingers of the robotic gripper 216. Furthermore, in the case where the object 210 is a component picked up from a storage bin, parts of other components in the storage bin may cover or occlude the object 210 partially. Thus, predefined grasp points of the object needing to be picked up may not be available and other grasp points may need to be selected.

To address the above-mentioned challenges, the robot manipulator 218 may be equipped with a machine vision system 208 and an ultrasound array 204. The machine vision system 208 may extract a geometrical outline of the object 210 using a technology such as a time-of-flight imaging, a stereovision analysis, a depth imaging, a three-dimensional scanning, a structured light analysis, or similar ones. From the geometrical outline of the object 210, a set of candidate grasp points may be selected based on force closure, as well as a type of the gripper used. The ultrasound array 204 may be used to exert a local force in the form of sound radiation pressure onto the candidate grasp points. The ultrasound array 204 may achieve locality of the remotely applied force by beam forming. The machine vision system 208 of the robot manipulator 218 may record the physical deformation that may result from the applied force. From the set of candidate grasp points, a subset of final grasp points may be selected that responds in the same or a similar way to the remotely applied force from the ultrasound array 204. Thus, the robot manipulator 218 may ensure that grasp points are selected that are likely to respond in a similar way in terms of friction and deformation when touched or contacted by the fingers of the robotic gripper 216 and the robotic gripper 216 has a stable grasp on the object 210.

Figure 3:
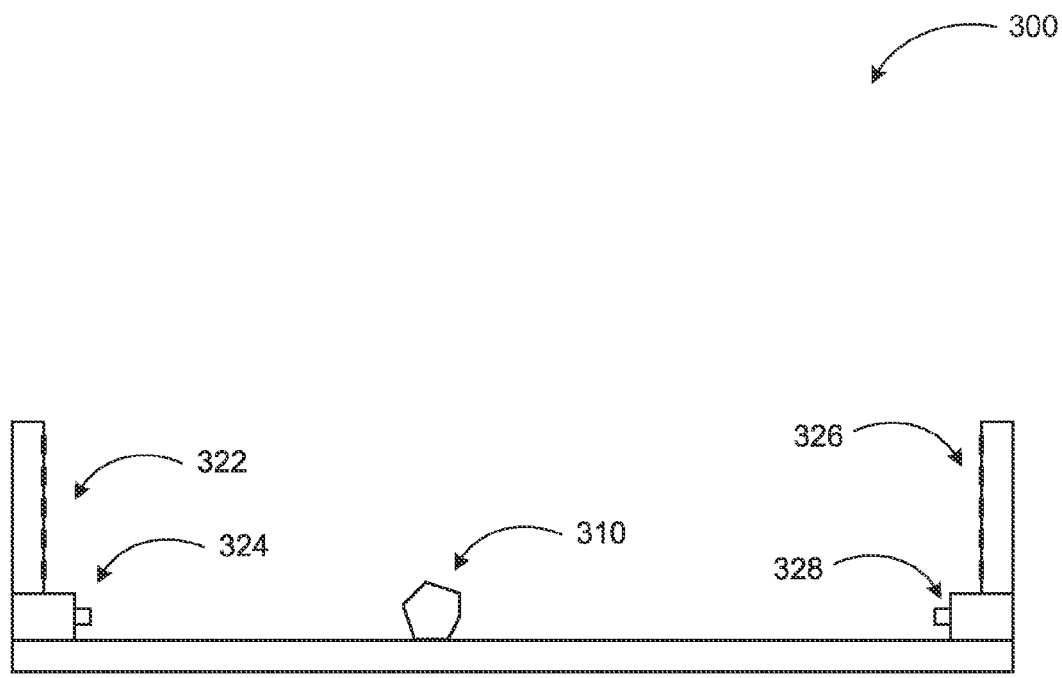
FIG. 3 illustrates an object on a workspace that is surrounded by machine vision and ultrasound transducers.

FIG. 3 illustrates an object on a workspace that is surrounded by machine vision and ultrasound transducers, arranged in accordance with at least some embodiments described herein.

A machine vision system as part of a robot manipulator may be used to provide an outline of an object from which initial grasp points may be identified. The machine vision system may be located on the robot manipulator as shown in FIG. 2. A diagram 300 shows an alternative configuration, where an object 310 may be located on a workspace that is surrounded by a multi-part machine vision system (324, 328) and ultrasound transducer arrays (322, 326). The object 310 may be handled on the workspace or the workspace may represent a storage bin used for storing parts of objects to be manufactured. By having a machine vision system and/or ultrasound transducer arrays with two or more components surrounding the object 310, the object 310 may be observed from multiple sides. Furthermore, the ultrasound transducer arrays may also be positioned to exert a force onto the object optimally. In some examples, the machine vision system (324, 328) and ultrasound transducer arrays (322, 326) may be adjustable or movable such that their locations and/or positions can be modified for different types (e.g., shape) of objects, lighting conditions, etc.

Figure 4:
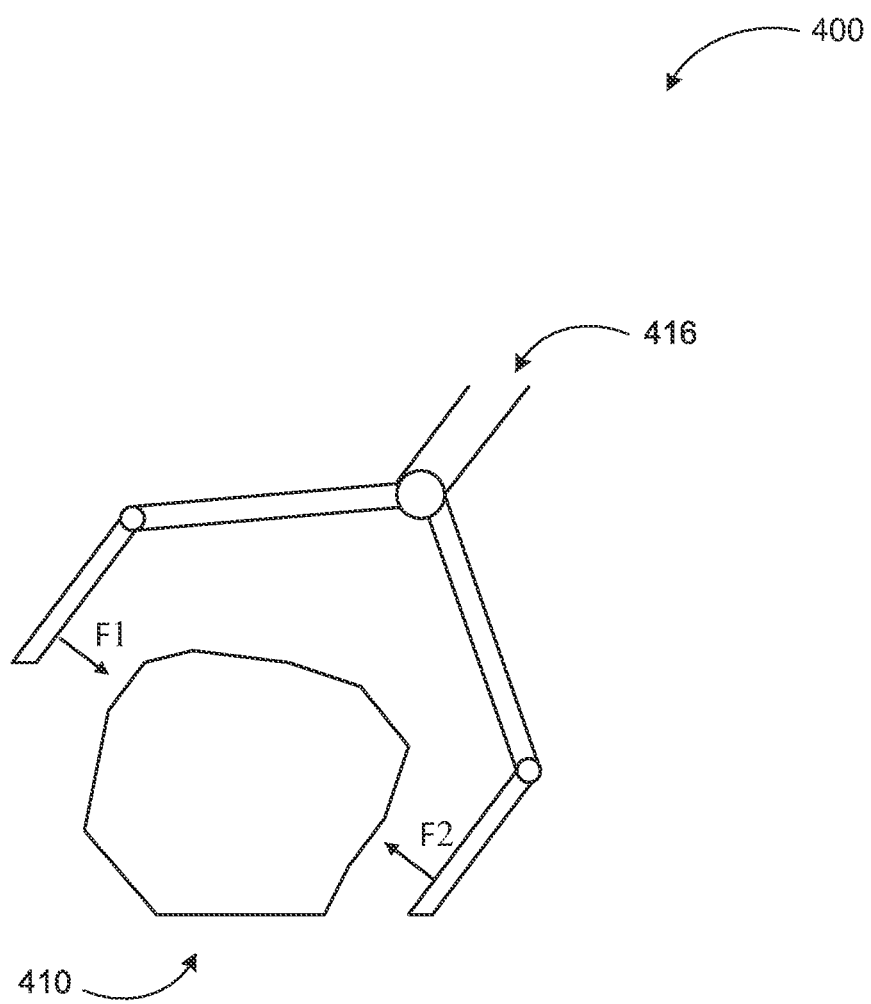
FIG. 4 illustrates a robotic gripper aligned to execute a grasp.

FIG. 4 illustrates a robotic gripper aligned to execute a grasp, arranged in accordance with at least some embodiments described herein.

The initial selection of the grasp points of an object may involve two stages in some examples. First, the object may be imaged with machine vision technology to extract a 3D outline. For this purpose, the machine vision technology may employ time-of-flight imaging techniques or structured light to extract a depth map from which an object outline may be obtained. Other techniques used in depth imaging or 3D scanning may also be used in other examples. Second, the outline of the object may be used to select the initial grasp points. The second stage may depend on a type of robotic gripper that is used. For example, when a robotic gripper with two fingers is used, a grasp may be defined by two grasp points. Several candidate grasps including of pairs of grasp points may be selected. When a gripper with three fingers is used, three grasp points may define a grasp. The candidate grasp points may also be selected based on physical constraints such as force closure. As discussed previously, force closure occurs when forces exerted by a grasp together with other external forces present sum to zero.

As shown in a diagram 400, an example robotic gripper 416 may be aligned to grab an object 410. The robotic gripper 416 has two fingers and for each finger, the exerted force on the object is given by $F_1$ and $F_2$, respectively. These forces may be equal in magnitude but their directions are opposite. For a robotic gripper with two fingers and no additional forces considered, equal and opposite forces $F_1$ and $F_2$ may achieve force closure. The robotic gripper 416 shown in the diagram 400 has a contact surface. For maximum grasp stability, the contact surface of the fingers of the robotic gripper 416 may be parallel to the surface of the object 410. This feature may be used for an initial selection of the grasp points. For a stable grasp, pairs of points on the surface may be selected that have a surface normal vector that is opposite.

Figure 5A:
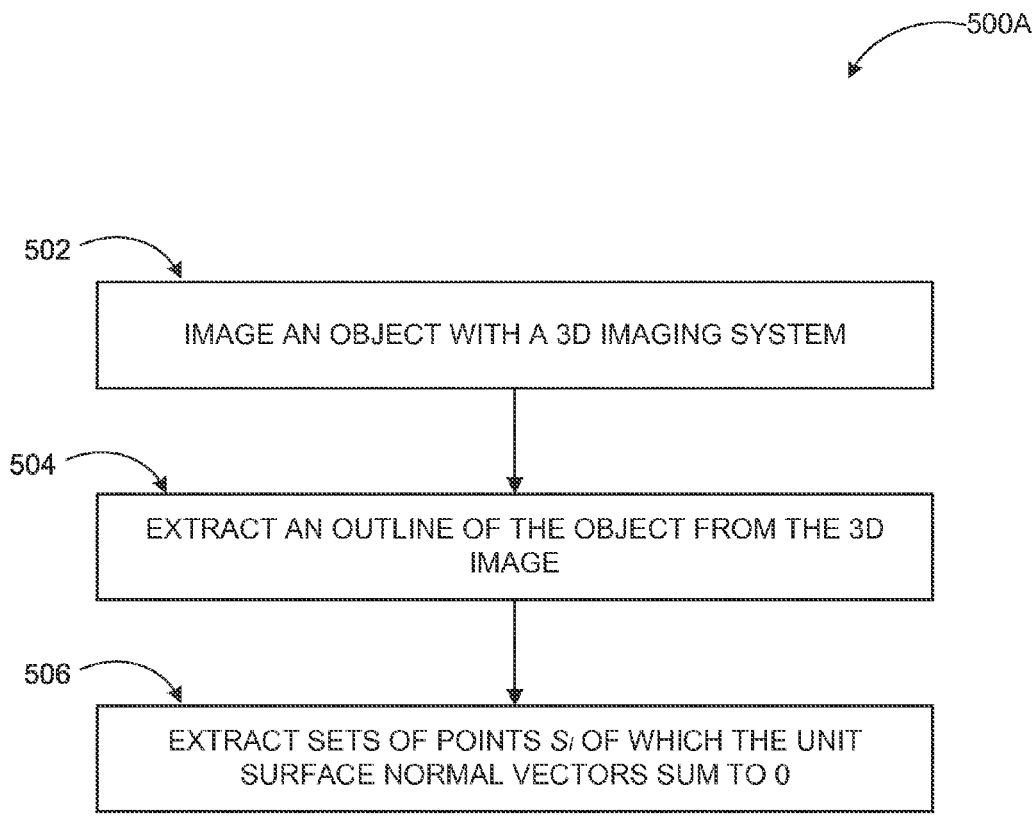
FIG. 5A illustrates an overview of a process for the selection of initial grasp points.

FIG. 5A illustrates an overview of a process for the selection of initial grasp points, arranged in accordance with at least some embodiments described herein.

An example process 500A to perform an initial selection of grasp points may begin with block 502, "IMAGE AN OBJECT WITH A 3D IMAGING SYSTEM," where a machine vision system may capture a 3D image of an object to be grasped by a robotic gripper. In block 504 following block 502, "EXTRACT AN OUTLINE OF THE OBJECT FROM THE 3D IMAGE," a controller may process the 3D image and extract a 3D outline of the object. Such an outline may define an outside surface of the object. In block 506 following block 504, "EXTRACT SETS OF POINTS SI OF WHICH THE UNIT SURFACE NORMAL VECTORS SUM TO 0," the controller may extract a set with sets of points $S_i$ based on the surface of the object. The set of all $S_i$ may be denoted by $\{S_i\}$ for i=1, ..., N, where N is the number of candidate grasp points as defined by the points in each $S_i$. In the case, where the robotic gripper has m fingers, each of the sets $S_i$ may include m locations on the surface of the object. The unit normal vectors corresponding to the points in each set of points $S_i$ may sum to zero. This condition may guarantee force closure when the points in $S_i$ are used as grasp points. An example case m=2 may corresponds to unit vectors that are pointed in opposite directions (two-finger robotic gripper).

Figure 5B:
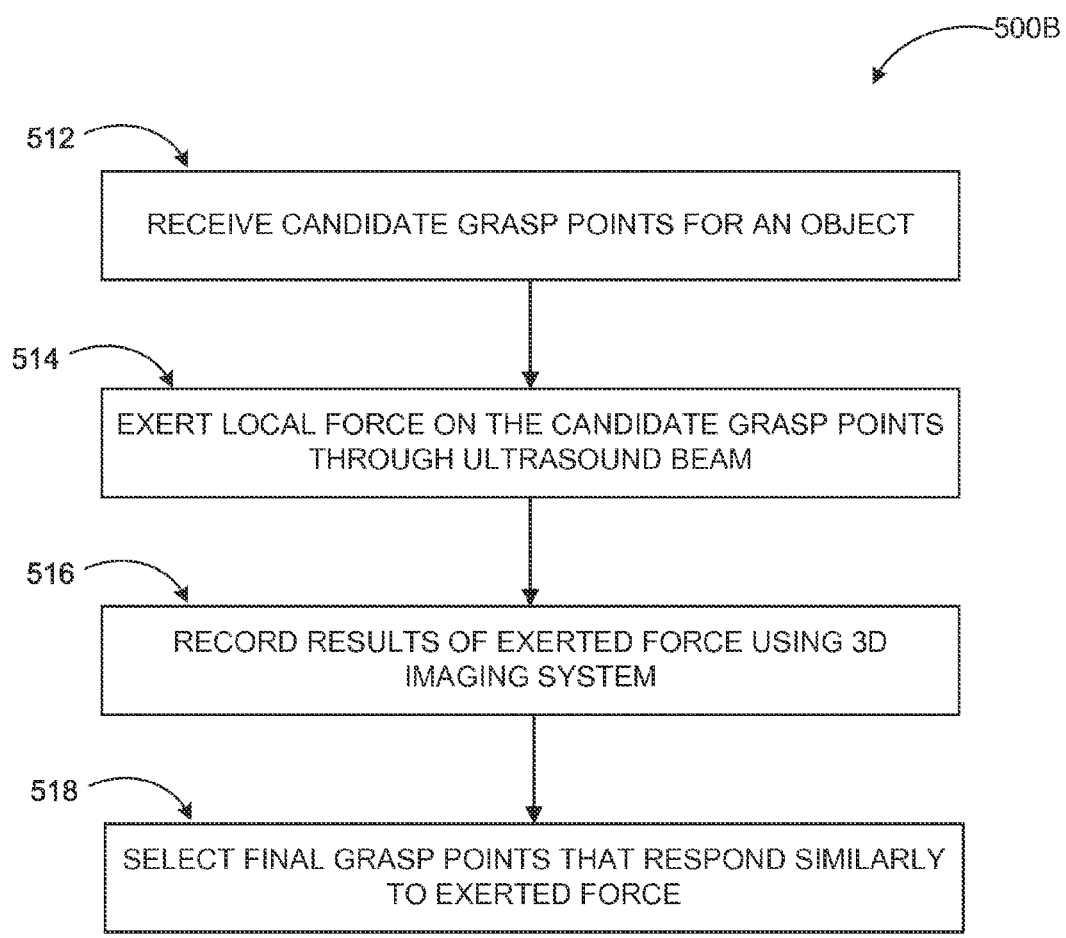
FIG. 5B illustrates an overview of a process for the selection of grasp points as may be implemented by a robot manipulator.

FIG. 5B illustrates an overview of a process for the selection of grasp points as may be implemented by a robot manipulator, arranged in accordance with at least some embodiments described herein.

An example process 500B to perform selection of final grasp points may begin with block 512, "RECEIVE CANDIDATE GRASP POINTS FOR AN OBJECT," where an initial selection of candidate grasp points may be received at a controller, for example, as a result of the initial selection process 500A. The candidate grasp points may be defined by the set $S_i$ that contains m candidate grasp points, for example. In block 514 following block 512, "EXERT LOCAL FORCE ON THE CANDIDATE GRASP POINTS THROUGH ULTRASOUND BEAM," an ultrasound transducer array may direct an ultrasound beam towards the each candidate grasp point in $S_i$ (for example, iteratively). Responses of the areas of object surface at or near the candidate grasp points may be recorded in block 516 following block 514, "RECORD RESULTS OF EXERTED FORCE USING 3D IMAGING SYSTEM." The responses may be denoted by $r_{i,j}$ and may represent, for example, the movement of the candidate grasp points over a set of time intervals. Furthermore, $r_{i,j}$ may also represent the movement of multiple points close to the candidate grasp points. In an iterative execution of the process 500B, j may be compared to m and when j<m, the process may continue for the other candidate grasp points in $S_i$. When j>=m, the process may terminate and the $r_{i,j}$ may be returned for j=1, ..., m. The process may be repeated for each of the candidate grasp points as defined by the $S_i$ for i=1, ..., N.

In block 518 following block 516, "SELECT FINAL GRASP POINTS THAT RESPOND SIMILARLY TO EXERTED FORCE," one of the $S_i$ is chosen as the set of final grasp points. In some examples, a controller performing the process 500B may select a $S_i$ for which the candidate grasp points behave in a similar way. The selection may be performed by forming a metric for each of the $S_i$ based on the similarity of the responses $r_{i,j}$. One such metric may be the maximum distance between the $r_{i,j}$ for j=1, ..., N. Such a metric may be computed for each $S_i$, and a $S_i$ may be selected that has the smallest associated metric, for example. Thus selecting a set of candidate grasp points of which the candidate grasp points behave as similar as possible under the exertion of a force. Other criteria may also be taken into account. For example, a set of candidate grasp points may be selected that react in a minimal way to the applied ultrasound beam. This selection may correspond to selecting grasp points of which the material surrounding the grasp point deforms little.

In other examples, a set of different ultrasound excitations may be used, where the excitations have different excitation strengths. For each excitation, the response of each candidate grasp point may be recorded. The results of the excitations may be taken into account in the selection of the final grasp points.

Figure 6:
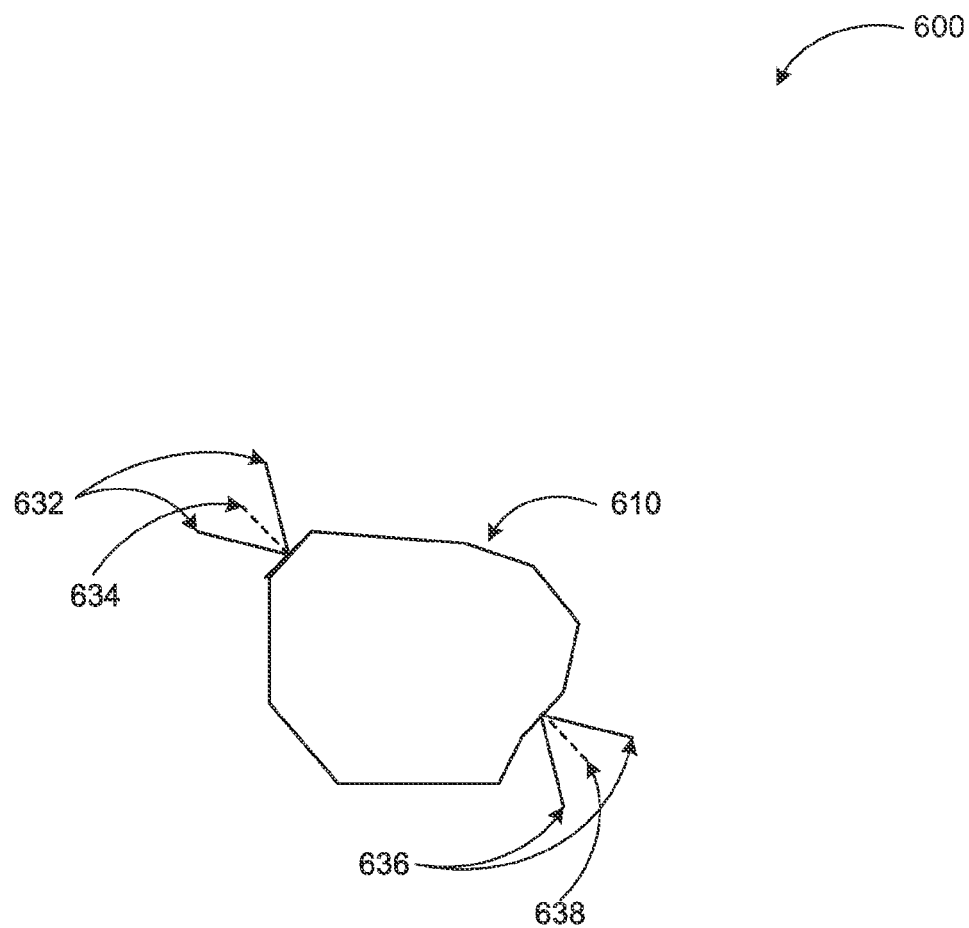
FIG. 6 illustrates an object where friction forces allow the force applied to the surface to lie in a friction cone.

FIG. 6 illustrates an object where friction forces allow the force applied to the surface to lie in a friction cone, arranged in accordance with at least some embodiments described herein.

It should be noted that in practice when the robotic gripper 416 of FIG. 4, for example, lifts the object 410, a physical condition of force closure may not be satisfied anymore because gravity also exerts a force on the object 410. However, a practical surface has a surface friction that is, for example, a function of the force applied in the direction normal to the surface. For a grasp and/or friction that is strong enough, such frictional forces may cancel the gravitational force. Moreover, the condition for force closure may also be relaxed because the frictional force may cancel a part of the force that is not normal (tangential) to the surface of the object.

As shown in a diagram 600, two parallel surfaces may be identified on an object 610, where surface normal vectors 634 and 638 point in opposite directions. A friction of the surfaces may be able to counter part of any tangential force applied to the grasp points. As a result, a force applied to the object may be allowed to lie in a friction cone to fulfill force closure such as friction cones 632 and 636 of the respective surfaces. A system according to example embodiments may take into account such friction cones to select initial grasp points for the object 610 by selecting candidate grasp points whose friction cones have central vectors that substantially sum to zero. The friction cones 632 and 636 may be determined based on characteristics of the materials forming the object 610. In other examples, if the material(s) of the object 610 are not known in advance, a worst-case estimate of a size of the friction cones may be used.

Figure 7:
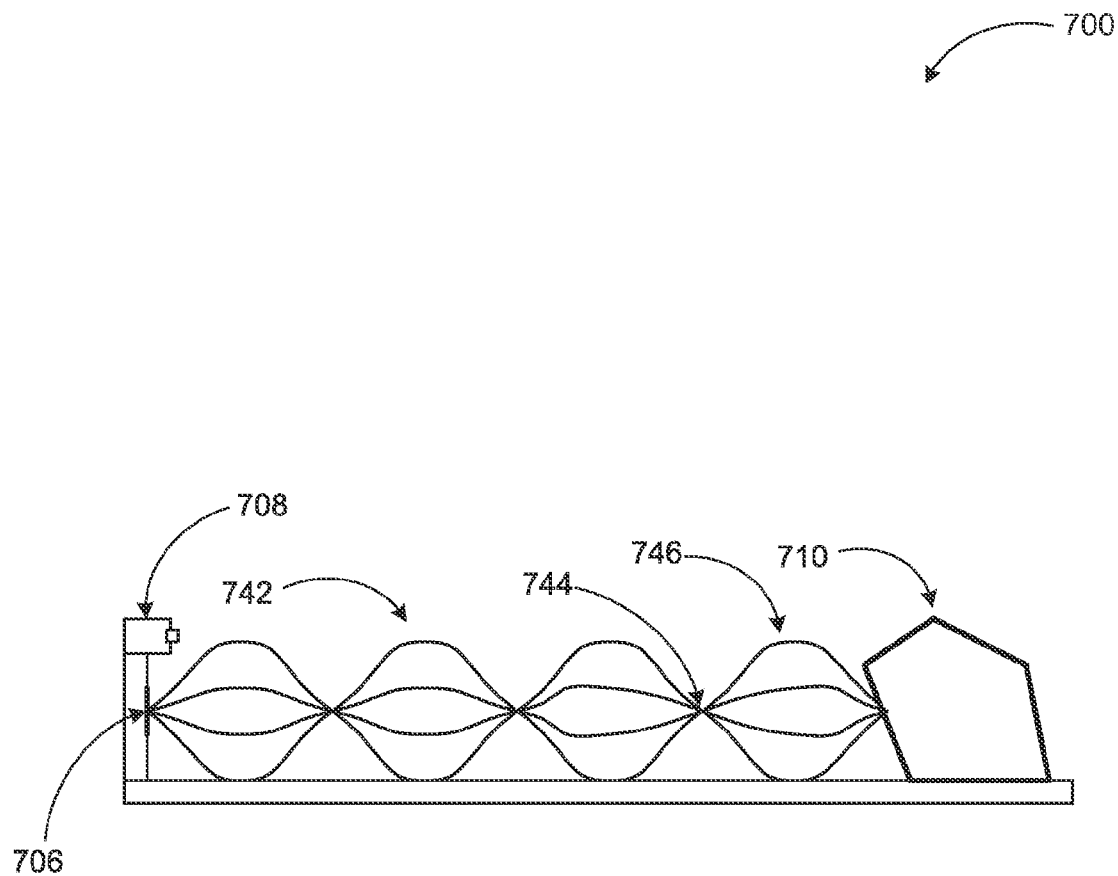
FIG. 7 illustrates a system to remotely exert a force or pressure onto an object.

FIG. 7 illustrates a system to remotely exert a force or pressure onto an object, arranged in accordance with at least some embodiments described herein.

As shown in a diagram 700, an ultrasound transducer 706 may generate a sound wave directed towards an object 710. The object 710 may reflect part of the sound wave and absorb another part. An ultrasound standing wave 742 may result between the ultrasound transducer 706 and the object 710. The position of nodes 744 and antinodes 746 of the ultrasound standing wave 742 may be determined by phase and frequency of a signal driving the ultrasound transducer 706. At the surface of the object 710, an acoustic radiation pressure may be exerted by the ultrasound wave. Thus, the ultrasound transducer 706 may apply an ultrasound beam by adjusting one or more of a phase and a frequency of an ultrasound signal such that the ultrasound standing wave 742 is formed between the ultrasound transducer 706 and the object 710 with a node of the ultrasound standing wave 742 coinciding with each candidate grasp point. Depending on the material of the object 710, its surface may respond to such applied force. A machine vision system 708 may record an effect (e.g., local deformation) on the surface of the object 710.

In some examples, an array of transducers may be used to achieve spatial locality of the applied ultrasound wave instead of a single transducer. In other examples, beam forming techniques such as directed transducers, dampeners, or reflectors may be used to direct the ultrasound beam to a specific location on the object 710.

The examples in FIGS. 1 through 7 have been described using specific apparatuses, configurations, and systems for grasp point selection for robotic grippers through machine vision and ultrasound beam based deformation. Embodiments for implementing grasp point selection for robotic grippers are not limited to the specific apparatuses, configurations, and systems according to these examples.

Figure 8:
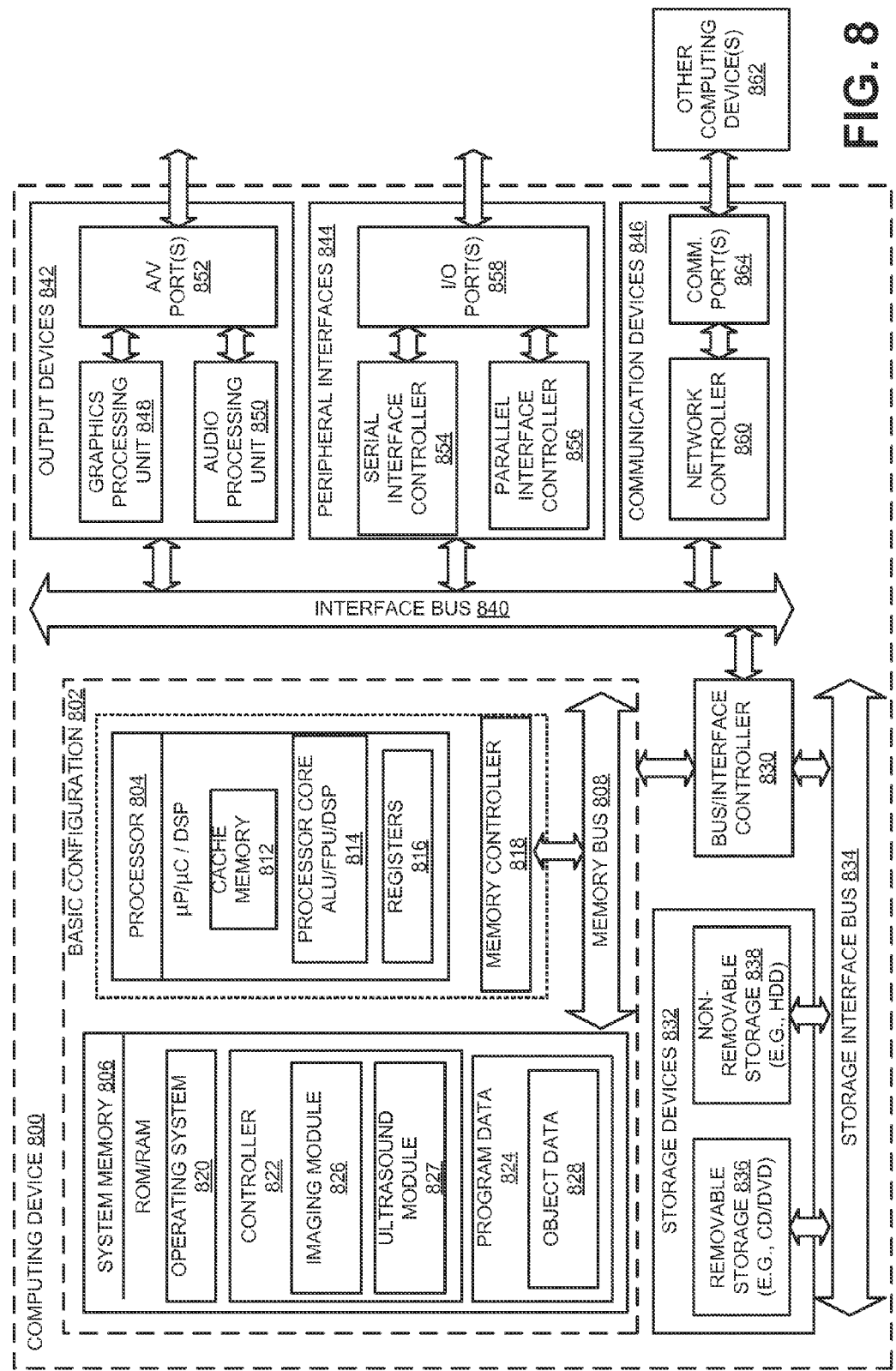
FIG. 8 illustrates a general purpose computing device, which may be used to control a robotic gripper to provide stable grasp point selection through machine vision and ultrasound based force exertion.

FIG. 8 illustrates a general purpose computing device, which may be used to control a robotic gripper to provide stable grasp point selection through machine vision and ultrasound based force exertion.

For example, the computing device 800 may be used as a server, desktop computer, portable computer, smart phone, special purpose computer, or similar device such as a controller, a new component, a cluster of existing components in an operational system. In an example basic configuration 802, the computing device 800 may include one or more processors 804 and a system memory 806. A memory bus 808 may be used for communicating between the processor 804 and the system memory 806. The basic configuration 802 is illustrated in FIG. 8 by those components within the inner dashed line.

Depending on the desired configuration, the processor 804 may be of any type, including but not limited to a microprocessor (μP), a microcontroller (μC), a digital signal processor (DSP), or any combination thereof. The processor 804 may include one more levels of caching, such as a level cache memory 812, one or more processor cores 814, and registers 818. The example processor cores 814 may (each) include an arithmetic logic unit (ALU), a floating point unit (FPU), a digital signal processing core (DSP Core), or any combination thereof. An example memory controller 818 may also be used with the processor 804, or in some implementations the memory controller 818 may be an internal part of the processor 804.

Depending on the desired configuration, the system memory 806 may be of any type including but not limited to volatile memory (such as RAM), non-volatile memory (such as ROM, flash memory, etc.) or any combination thereof. The system memory 806 may include an operating system 820, a controller application 822, and program data 824. The controller application 822 may include an imaging module 826 and an ultrasound module 827, which may be an integral part of the application or separate applications of their own. The imaging module 826 may capture 3D image(s) of an object to determine an outline of the object in order to determine candidate grasp points and subsequently additional 3D image(s) to determine local deformations in response to an applied force by an ultrasound beam. The ultrasound module 827 may control one or more arrays of ultrasound transducers and exert force at or near the candidate grasp points through an ultrasound beam. The controller application 822 may then determine final grasp points based on the local deformations associated with the candidate grasp points. The program data 824 may include, among other data, object data 828 related to candidate and final grasp points and object outlines, as described herein.

The computing device 800 may have additional features or functionality, and additional interfaces to facilitate communications between the basic configuration 802 and any desired devices and interfaces. For example, a bus/interface controller 830 may be used to facilitate communications between the basic configuration 802 and one or more data storage devices 832 via a storage interface bus 834. The data storage devices 832 may be one or more removable storage devices 836, one or more non-removable storage devices 838, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 806, the removable storage devices 836 and the non-removable storage devices 838 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 800. Any such computer storage media may be part of the computing device 800.

The computing device 800 may also include an interface bus 840 for facilitating communication from various interface devices (for example, one or more output devices 842, one or more peripheral interfaces 844, and one or more communication devices 846) to the basic configuration 802 via the bus/interface controller 830. Some of the example output devices 842 include a graphics processing unit 848 and an audio processing unit 850, which may be configured to communicate to various external devices such as a display or speakers via one or more A/V ports 852. One or more example peripheral interfaces 844 may include a serial interface controller 854 or a parallel interface controller 856, which may be configured to communicate with external devices such as input devices (for example, keyboard, mouse, pen, voice input device, touch input device, etc.) or other peripheral devices (for example, printer, scanner, etc.) via one or more I/O ports 858. An example communication device 846 includes a network controller 860, which may be arranged to facilitate communications with one or more other computing devices 862 over a network communication link via one or more communication ports 864. The one or more other computing devices 862 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 800 may be implemented as a part of a general purpose or specialized server, mainframe, or similar computer that includes any of the above functions. The computing device 800 may also be implemented as a personal computer including both laptop computer and non-laptop computer configurations.

Example embodiments may also include methods to implement grasp point selection for robotic grippers through machine vision and ultrasound beam based deformation. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 9:
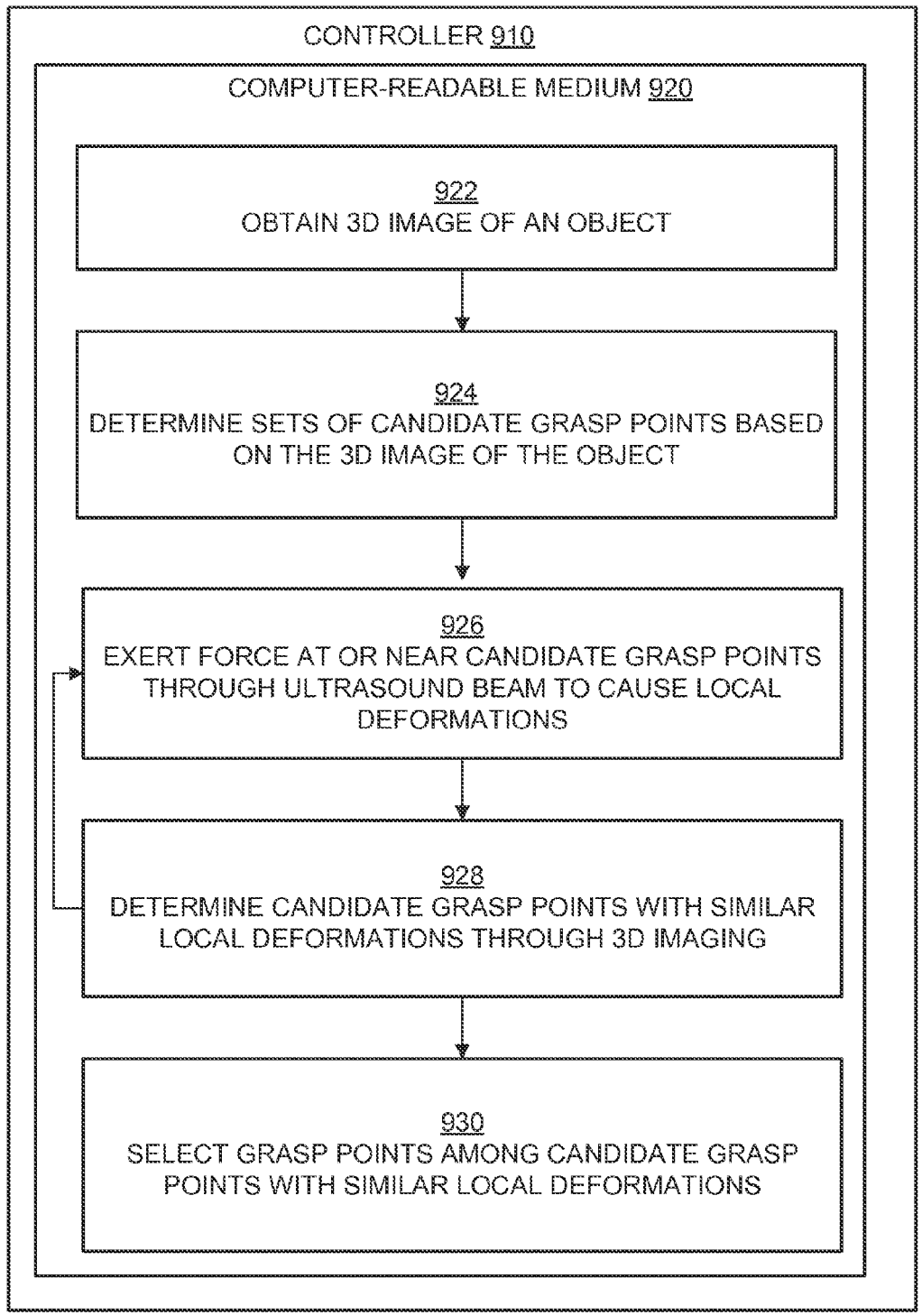
FIG. 9 is a flow diagram illustrating an example process to provide stable grasp point selection through machine vision and ultrasound based force exertion that may be performed by a computing device such as the computing device in FIG. 8.

FIG. 9 is a flow diagram illustrating an example process to provide stable grasp point selection through machine vision and ultrasound based force exertion that may be performed by a computing device such as the computing device in FIG. 8, arranged in accordance with at least some embodiments described herein.

Example methods may include one or more operations, functions or actions as illustrated by one or more of blocks 922, 924, 926, 928, and/or 930. The operations described in the blocks 922 through 930 may also be stored as computer-executable instructions in a computer-readable medium such as a computer-readable medium 920 of a controller 910.

An example process to implement grasp point selection for robotic grippers through machine vision and ultrasound beam based deformation may begin with block 922, "OBTAIN 3D IMAGE OF AN OBJECT," where the imaging module 826 may capture a 3D image of an object to be grasped by a robotic gripper. The imaging module 826 or the controller application 822 may create an outline of the object from the 3D image.

Block 922 may be followed by block 924, "DETERMINE SETS OF CANDIDATE GRASP POINTS BASED ON THE 3D IMAGE OF THE OBJECT," where the controller application 822 may select sets of candidate grasp points from an outline of the object (derived from the 3D image) based on physical constraints such as force closure. To achieve force closure, set of candidate grasp points may be selected such that forces exerted on the object by a grasp together with other external forces present sum to zero.

Block 924 may be followed by block 926, "EXERT FORCE AT OR NEAR CANDIDATE GRASP POINTS THROUGH ULTRASOUND BEAM TO CAUSE LOCAL DEFORMATIONS," where one or more ultrasound transducers controlled by the ultrasound module 827 may be used to apply an ultrasound beam and exert a local force on the candidate grasp points such that local deformations are caused on the object. Information associated with the final grasp points may be provided to a robotic gripper controller to be used in grasping the object.

Block 926 may be followed by block 928, "DETERMINE CANDIDATE GRASP POINTS WITH SIMILAR LOCAL DEFORMATIONS THROUGH 3D IMAGING," where the imaging module 826 may record the local deformations through capturing additional 3D images and the controller application 822 may determine grasp points among the sets of candidate grasp points where the local deformations are similar. The operations described in blocks 926 and 928 may be iterative and repeated until all or a preset number of candidate grasp points are tested.

Block 928 may be followed by block 930, "SELECT GRASP POINTS AMONG CANDIDATE GRASP POINTS WITH SIMILAR LOCAL DEFORMATIONS," where the controller application 822 may select final grasp points among the sets of candidate grasp points based on a similarity of the local deformations associated with each candidate grasp point.

The blocks included in the above-described process are for illustration purposes. Grasp point selection for robotic grippers through machine vision and ultrasound beam based deformation may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

FIG. 10 illustrates a block diagram of an example computer program product, arranged in accordance with at least some embodiments described herein.

In some embodiments, as shown in FIG. 10, the computer program product 1000 may include a signal bearing medium 1002 that may also include one or more machine readable instructions 1004 that, when executed by, for example, a processor, may provide the functionality described herein. Thus, for example, referring to the processor 804 in FIG. 8, the imaging module 826 and the ultrasound module 827 in conjunction with the controller application 822 executed on the processor 804 may undertake one or more of the tasks shown in FIG. 10 in response to the instructions 1004 conveyed to the processor 804 by the medium 1002 to perform actions associated with grasp point selection for robotic grippers through machine vision and ultrasound beam based deformation as described herein. Some of those instructions may include, for example, one or more instructions to obtain 3D image of an object, determine sets of candidate grasp points based on the 3D image of the object, exert force at or near candidate grasp points through ultrasound beam to cause local deformations, determine candidate grasp points with similar local deformations through 3D imaging, and determine the particular distance between the select grasp points among candidate grasp points with similar local deformations.

In some implementations, the signal bearing medium 1002 depicted in FIG. 10 may encompass a computer-readable medium 1006, such as, but not limited to, a hard disk drive, a solid state drive, a Compact Disc (CD), a Digital Versatile Disk (DVD), a digital tape, memory, etc. In some implementations, the signal bearing medium 1002 may encompass a recordable medium 1008, such as, but not limited to, memory, read/write (R/W) CDs, R/W DVDs, etc. In some implementations, the signal bearing medium 1002 may encompass a communications medium 1010, such as, but not limited to, a digital and/or an analog communication medium (for example, a fiber optic cable, a waveguide, a wired communications link, a wireless communication link, etc.). Thus, for example, the program product 1000 may be conveyed to one or more modules of the processor 804 of FIG. 8 by an RF signal bearing medium, where the signal bearing medium 1002 is conveyed by the wireless communications medium 1010 (for example, a wireless communications medium conforming with the IEEE 802.11 standard).

According to some examples, methods to provide grasp point selection for robotic grippers are described. An example the method may include obtaining a three-dimensional image of an object to be grasped by a robotic gripper, determining two or more sets of candidate grasp points on two or more surfaces of the object based on the three-dimensional image, and exerting a local force on each of the candidate grasp points in the two or more sets of candidate grasp points such that a local deformation is caused at or near each candidate grasp point. The method may also include selecting a set of grasp points from the two or more sets of candidate grasp points based on a response of a surface area at or near each candidate grasp point to the exerted force.

According to other examples, selecting the set of grasp points from the two or more sets of candidate grasp points may include selecting the set of grasp points based on a similarity of local deformations at or near candidate grasp points or selecting the set of grasp points based on a minimal response to the exerted local force or amounts of local deformations. The method may further include recording local deformations at or near each of the candidate grasp points in the two or more sets of candidate grasp points.

According to further examples, exerting the local force on each of the candidate grasp points in the two or more sets of candidate grasp points may include exerting the local force by applying an ultrasound beam to each of the candidate grasp points in the two or more sets of candidate grasp points. The method may also include applying the ultrasound beam by adjusting one or more of a phase and a frequency of an ultrasound signal such that a ultrasound standing wave is formed between an ultrasound signal source and the object with a node of the ultrasound standing wave coinciding with each candidate grasp point.

According to yet other examples, determining the two or more sets of candidate grasp points on the two or more surfaces of the object may include determining the two or more candidate grasp points based on one or more of a shape of the object, an orientation of the object, and a type of the robotic gripper; or extracting an outline of the object from the three-dimensional image; and extracting the two or more sets of candidate grasp points on the two or more surfaces of the object based on the outline, where a sum of surface normal vectors for each of the candidate grasp points in each of the two or more sets of candidate grasp points is zero. Extracting the outline of the object from the three-dimensional image may include employing one or more of a time-of-flight imaging, a stereovision analysis, a depth imaging, a three-dimensional scanning, and a structured light analysis. The method may also include selecting a number of points in each set of the candidate grasp points based on a number of fingers of the robotic gripper.

According to other examples, systems to provide grasp point selection for robotic grippers are described. An example the system may include a three-dimensional imaging module configured to obtain a three-dimensional image of an object to be grasped by a robotic gripper; an ultrasound signal source configured to exert a local force on each candidate grasp point in two or more sets of candidate grasp points such that a local deformation is caused at or near each candidate grasp point; and a controller coupled to the three-dimensional imaging module and the ultrasound signal source. The controller may be configured to determine the two or more sets of candidate grasp points on two or more surfaces of the object based on the three-dimensional image; select a set of grasp points from the two or more sets of candidate grasp points based on a response of a surface area at or near each candidate grasp point to the exerted force; and provide information associated with the selected set of grasp points to the robotic gripper.

According to some examples, the controller may be further configured to select the set of grasp points to increase a probability that surface areas of the object at or near the set of grasp points react in a similar way when the robotic gripper executes a corresponding grasp. The three-dimensional imaging module may be further configured to extract an outline of the object from the three-dimensional image; and the controller may be further configured to extract the two or more sets of candidate grasp points on the two or more surfaces of the object based on the outline, where a sum of central vectors of friction cones for each of the candidate grasp points in each of the two or more sets of candidate grasp points is substantially zero. The controller may be further configured to select a size of the friction cones based on one or more of a robotic gripper type, an object shape, and a surface material of the object.

According to yet other examples, the ultrasound signal source may be further configured to exert the local force at two or more predefined levels; the three-dimensional imaging module is further configured to record local deformations at or near each of the candidate grasp points in the two or more sets of candidate grasp points in response to the exerted local force at the at two or more predefined levels; and the controller is further configured to select the set of grasp points from the two or more sets of candidate grasp points based on the recorded local deformations at or near each of the candidate grasp points. The ultrasound signal source may include a movable ultrasound transducer array or two or more stationary ultrasound transducer arrays. The three-dimensional imaging module may include a movable machine vision system or two or more stationary machine vision systems.

According to further examples, a controller to provide grasp point selection for robotic grippers is described. The controller may include a memory configured to store instructions; a communication module configured to communicate with an ultrasound signal source, a three-dimensional imaging module, and a robotic gripper; and a processor communicatively coupled to the memory and the communication module. The processor may be configured to control the three-dimensional imaging module to obtain a three-dimensional image of an object to be grasped by the robotic gripper; extract an outline of the object from the three-dimensional image; extract two or more sets of candidate grasp points on two or more surfaces of the object based on the outline; control the ultrasound signal source to exert a local force on each candidate grasp point in the two or more sets of candidate grasp points such that a local deformation is caused at or near each candidate grasp point; select a set of grasp points from the two or more sets of candidate grasp points based on a response of a surface area at or near each candidate grasp point to the exerted force; and provide information associated with the selected set of grasp points to the robotic gripper.

According to other examples, the processor may be configured to select the set of grasp points from the two or more sets of candidate grasp points based one or more of: a similarity of local deformations at or near candidate grasp points, a minimal response to the exerted local force, and amounts of local deformations. The processor may also be configured to select a number of points in each set of the candidate grasp points based on a number of fingers of the robotic gripper. A shape of the object may be unknown in advance and/or partially occluded. The controller may be further configured to control the robotic gripper for movement of objects in one or an assembly area and a storage area.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and or firmware would be possible in light of this disclosure.

The present disclosure is not to be limited in terms of the particular embodiments described in this application, which are intended as illustrations of various aspects. Many modifications and variations can be made without departing from its spirit and scope Functionally equivalent methods and apparatuses within the scope of the disclosure, in addition to those enumerated herein, will be possible from the foregoing descriptions. Such modifications and variations are intended to fall within the scope of the appended claims. The present disclosure includes the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to provide grasp point selection for robotic grippers, the method comprising:
  obtaining a three-dimensional image of an object to be grasped by a robotic gripper;
  determining two or more sets of candidate grasp points on two or more surfaces of the object based on the three-dimensional image, wherein determining the two or more sets of candidate grasp points on the two or more surfaces of the object comprises:
    extracting an outline of the object from the three-dimensional image; and
    extracting the two or more sets of candidate grasp points on the two or more surfaces of the object based on the outline, wherein a sum of surface normal vectors for each candidate grasp point in each set of the two or more sets of candidate grasp points is zero;
  exerting a local force on each candidate grasp point in the two or more sets of candidate grasp points such that a local deformation is caused at or near each candidate grasp point; and selecting a set of grasp points from the two or more sets of candidate grasp points based on a response of a surface area at or near each candidate grasp point to the exerted local force.

2. The method of claim 1, wherein selecting the set of grasp points from the two or more sets of candidate grasp points comprises:
selecting the set of grasp points based on a similarity of the local deformation at or near each candidate grasp point.

3. The method of claim 1, wherein selecting the set of grasp points from the two or more sets of candidate grasp points comprises:
selecting the set of grasp points based on a minimal response to the exerted local force or an amount of the local deformation at or near each candidate grasp point.

4. The method of claim 1, further comprising:
recording the local deformation at or near each candidate grasp point in the two or more sets of candidate grasp points.

5. The method of claim 1, wherein exerting the local force on each candidate grasp point in the two or more sets of candidate grasp points comprises:
exerting the local force by applying an ultrasound beam to each candidate grasp point in the two or more sets of candidate grasp points.

6. The method of claim 5, further comprising:
applying the ultrasound beam by adjusting one or more of a phase and a frequency of an ultrasound signal such that an ultrasound standing wave is formed between an ultrasound signal source and the object with a node of the ultrasound standing wave coinciding with each candidate grasp point.

7. The method of claim 1, wherein determining the two or more sets of candidate grasp points on the two or more surfaces of the object further comprises:
determining the two or more sets of candidate grasp points based on one or more of a shape of the object, an orientation of the object, and a type of the robotic gripper.

8. The method of claim 1, wherein extracting the outline of the object from the three-dimensional image comprises:
employing one or more of a time-of-flight imaging, a stereovision analysis, a depth imaging, a three-dimensional scanning, and a structured light analysis.

9. The method of claim 1, further comprising:
selecting a number of grasp points in each set of the two or more sets of candidate grasp points based on a number of fingers of the robotic gripper.

10. A system to provide grasp point selection for robotic grippers, the system comprising:
a three-dimensional imaging module configured to:
obtain a three-dimensional image of an object to be grasped by a robotic gripper;
an ultrasound signal source configured to:
exert a local force on each candidate grasp point in two or more sets of candidate grasp points such that a local deformation is caused at or near each candidate grasp point; and
a controller coupled to the three-dimensional imaging module and the ultrasound signal source, wherein the controller is configured to:
determine the two or more sets of candidate grasp points on two or more surfaces of the object based on the three-dimensional image;
select a set of grasp points from the two or more sets of candidate grasp points based on a response of a surface area at or near each candidate grasp point to the exerted local force; and
provide information associated with the selected set of grasp points to the robotic gripper, wherein:
the three-dimensional imaging module is further configured to:
extract an outline of the object from the three-dimensional image; and
to determine the two or more sets of candidate grasp points, the controller is configured to:
extract the two or more sets of candidate grasp points on the two or more surfaces of the object based on the outline, wherein a sum of central vectors of friction cones for each candidate grasp point in each set of the two or more sets of candidate grasp points is substantially zero.

11. The system of claim 10, wherein the controller is further configured to select the set of grasp points to increase a probability that surface areas of the object at or near the set of grasp points react in a similar way when the robotic gripper executes a corresponding grasp.

12. The system of claim 10, wherein the controller is further configured to select a size of the friction cones based on one or more of a robotic gripper type, an object shape, and a surface material of the object.

13. The system of claim 10, wherein
the ultrasound signal source is further configured to:
exert the local force at two or more particular levels;
the three-dimensional imaging module is further configured to:
record the local deformation at or near each candidate grasp point in the two or more sets of candidate grasp points in response to the exerted local force at the two or more particular levels; and
the controller is further configured to:
select the set of grasp points from the two or more sets of candidate grasp points based on the recorded local deformation at or near each candidate grasp point.

14. The system of claim 10, wherein the ultrasound signal source comprises a movable ultrasound transducer array.

15. The system of claim 10, wherein the ultrasound signal source comprises two or more stationary ultrasound transducer arrays.

16. The system of claim 10, wherein the three-dimensional imaging module comprises a movable machine vision system.

17. The system of claim 10, wherein the three-dimensional imaging module comprises two or more stationary machine vision systems.

18. A controller to provide grasp point selection for robotic grippers, the controller comprising:
a memory configured to store instructions;
a communication module configured to communicate with an ultrasound signal source, a three-dimensional imaging module, and a robotic gripper; and
a processor communicatively coupled to the memory and the communication module, the processor configured to:
control the three-dimensional imaging module to obtain a three-dimensional image of an object to be grasped by the robotic gripper;
extract an outline of the object from the three-dimensional image;
extract two or more sets of candidate grasp points on two or more surfaces of the object based on the outline, wherein a sum of surface normal vectors for each candidate grasp point in each set of the two or more sets of candidate grasp points is zero;

control the ultrasound signal source to exert a local force on each candidate grasp point in the two or more sets of candidate grasp points such that a local deformation is caused at or near each candidate grasp point;

select a set of grasp points from the two or more sets of candidate grasp points based on a response of a surface area at or near each candidate grasp point to the exerted local force; and provide information associated with the selected set of grasp points to the robotic gripper.

19. The controller of claim 18, wherein the processor is configured to select the set of grasp points from the two or more sets of candidate grasp points based on one or more of: a similarity of the local deformation at or near candidate grasp points, a minimal response to the exerted local force, and an amount of the local deformation for each candidate rasp point.

20. The controller of claim 18, wherein the processor is configured to select a number of grasp points in each set of the two or more sets of candidate grasp points based on a number of fingers of the robotic gripper.

21. The controller of claim 18, wherein a shape of the object is unknown in advance and/or partially occluded.

22. The controller of claim 18, wherein the controller is configured to control the robotic gripper for a movement of objects in one of an assembly area and a storage area.

* * * * *

UNITED STATES PATENT AND TRADEMARK OFFICE
CERTIFICATE OF CORRECTION

| | |
|---|---|
| PATENT NO. | : 9,889,564 B2 |
| APPLICATION NO. | : 14/794648 |
| DATED | : February 13, 2018 |
| INVENTOR(S) | : Cronie |

It is certified that error appears in the above-identified patent and that said Letters Patent is hereby corrected as shown below:

In the Drawings

In Fig. 8, Sheet 9 of 11, delete, for Tag "822", Line 1, "CONTROLLER 822" and insert -- CONTROLLER APPLICATION 822 --, therefor.

In the Specification

In Column 8, Line 39, delete "one more" and insert -- one or more --, therefor.

In Column 8, Line 39, delete "as a level" and insert -- as a --, therefor.

In Column 8, Line 41, delete "registers 818." and insert -- registers 816. --, therefor.

In Column 8, Line 46, delete "implementations the" and insert -- implementations, the --, therefor.

In Column 9, Line 28, delete "solid state drives," and insert -- solid state drives (SSDs), --, therefor.

In Column 11, Line 40, delete "medium 1002" and insert -- signal bearing medium 1002 --, therefor.

In Column 11, Lines 55-56, delete "a hard disk drive, a solid state drive," and insert -- a hard disk drive (HDD), a solid state drive (SSD), --, therefor.

In Column 11, Line 65, delete "communications link," and insert -- communication link, --, therefor.

In Column 11, Line 66, delete "program product 1000" and insert -- computer program product 1000 --, therefor.

In Column 14, Line 31, delete "and or" and insert -- and/or --, therefor.

In Column 14, Line 58, delete "hard disk drive," and insert -- hard disk drive (HDD), --, therefor.

Signed and Sealed this
Twenty-fourth Day of July, 2018

Andrei Iancu
*Director of the United States Patent and Trademark Office*

In Column 14, Lines 62-63, delete "communications link," and insert -- communication link, --, therefor.

In Column 15, Line 53, delete "recitation no" and insert -- recitation, no --, therefor.

In Column 16, Line 8, delete "general such" and insert -- general, such --, therefor.

In the Claims

In Column 19, Line 20, in Claim 19, delete "rasp point." and insert -- grasp point. --, therefor.